(12) United States Patent
Figger

(10) Patent No.: US 11,191,217 B2
(45) Date of Patent: Dec. 7, 2021

(54) AGRICULTURAL BALER PICKUP WITH LATERAL ADJUSTMENT

(71) Applicant: AGCO Corporation, Duluth, GA (US)

(72) Inventor: Robert L. Figger, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 16/954,980

(22) PCT Filed: Dec. 11, 2018

(86) PCT No.: PCT/IB2018/059860
§ 371 (c)(1),
(2) Date: Jun. 17, 2020

(87) PCT Pub. No.: WO2019/130139
PCT Pub. Date: Jul. 4, 2019

(65) Prior Publication Data
US 2021/0204483 A1    Jul. 8, 2021

Related U.S. Application Data

(60) Provisional application No. 62/610,730, filed on Dec. 27, 2017.

(51) Int. Cl.
*A01F 15/10*    (2006.01)
*A01F 15/07*    (2006.01)
*A01D 89/00*    (2006.01)

(52) U.S. Cl.
CPC ............ *A01F 15/106* (2013.01); *A01F 15/07* (2013.01); *A01D 89/002* (2013.01); *A01F 2015/078* (2013.01)

(58) Field of Classification Search
CPC .. A01F 15/106; A01F 15/07; A01F 2015/078; A01D 89/002
See application file for complete search history.

(56) References Cited

U.S. PATENT DOCUMENTS

| | | | | |
|---|---|---|---|---|
| 5,036,652 A | * | 8/1991 | Schmittbetz | A01D 43/00 56/16.4 R |
| 5,127,217 A | * | 7/1992 | Fell | A01D 43/02 56/341 |

(Continued)

FOREIGN PATENT DOCUMENTS

| | | |
|---|---|---|
| DE | 38 11 649 C1 | 6/1989 |
| EP | 0298798 A2 | 1/1989 |

(Continued)

OTHER PUBLICATIONS

UK Intellectual Property Office, Search Report for related UK Application No. GB1800822.7, dated Jul. 12, 2018.

(Continued)

*Primary Examiner* — Arpad Fabian-Kovacs

(57) ABSTRACT

An agricultural crop baler (20) includes a baling chamber (44), a crop pickup (26), and an adjustable partition mechanism (28). The crop pickup (26) is upstream from the baling chamber (44) to collect severed crop material and direct a flow of crop material toward the baling chamber. The partition mechanism is located between the crop pickup and the baling chamber to control the flow of crop material from the crop pickup to the baling chamber. The partition mechanism (28) includes a wall assembly (68) that at least partly defines a crop passage (76) extending along a crop-flow direction between the crop pickup (26) and the baling chamber (44). The wall assembly (68) includes a shiftable wall (74a, b) that is shiftable transversely to the crop-flow direction to adjustably vary the crop passage and thereby the flow of crop material to the baling chamber (44).

16 Claims, 7 Drawing Sheets

(56) References Cited

U.S. PATENT DOCUMENTS

| | | | |
|---|---|---|---|
| 6,029,434 A | 2/2000 | Ratzlaff et al. | |
| 7,191,699 B1* | 3/2007 | Anstey | A01F 15/07 100/87 |
| 7,448,196 B2 | 11/2008 | Schrag et al. | |
| 2004/0011016 A1* | 1/2004 | McClure | A01F 15/106 56/341 |
| 2004/0221562 A1* | 11/2004 | Snider | A01D 57/26 56/16.4 R |
| 2010/0071339 A1* | 3/2010 | Viaud | A01D 90/04 56/341 |
| 2014/0083071 A1* | 3/2014 | Fay, II | A01D 43/006 56/15.6 |
| 2014/0144119 A1 | 5/2014 | Olander et al. | |
| 2016/0066509 A1* | 3/2016 | Fay, II | A01D 57/28 56/192 |
| 2016/0219790 A1* | 8/2016 | McClure | A01F 15/07 |
| 2018/0310473 A1* | 11/2018 | Jespersen | A01D 34/49 |
| 2018/0325024 A1* | 11/2018 | Rotole | A01D 57/24 |

FOREIGN PATENT DOCUMENTS

| | | |
|---|---|---|
| EP | 3 238 526 A1 | 11/2017 |
| FR | 2832394 A1 | 5/2003 |

OTHER PUBLICATIONS

European Patent Office, International Search Report for related International Application No. PCT/IB2018/059860, dated Mar. 19, 2019.

* cited by examiner

AGRICULTURAL BALER PICKUP WITH LATERAL ADJUSTMENT

BACKGROUND

1. Field

The present invention relates generally to agricultural balers. More specifically, embodiments of the present invention concern an agricultural crop baler with a partition that shifts laterally to adjust the flow of severed crop material into the baling chamber.

2. Discussion of Prior Art

Farmers typically use a machine, such as a round baler, to collect crop materials from a windrow and form the crop materials into a bale for easier transport or storage. Conventional balers include a pickup header to pickup the windrow from the ground as the baler is advanced along the windrow. The pickup header also directs the crop materials rearwardly toward a baling chamber where the materials are formed into a bale. The baling chamber generally has a width somewhat larger than the width of the windrow. This permits the baler to collect the entire windrow, even if the baler is towed somewhat laterally off-center relative to the windrow. Furthermore, the pickup header generally has a width larger than the width of the baling chamber to provide additional room for the baler to be towed in an off center position relative to the windrow.

However, prior art balers have various deficiencies. One common problem associated with known balers is that crop materials can be distributed unevenly along the width of the baling chamber, which can make for an inconsistent or nonuniform bale. Uneven crop material density within the bale can occur due to various reasons. For instance, windrows generally do not have a uniform distribution of crop material. Also, off-center positioning of the baler relative to the windrow can lead to more crop material being introduced on one side of the bale compared to the other side, even if the windrow itself is uniform. Yet further, when the width of the windrow is generally less than the baling chamber width, less crop material can be introduced on at least one side of the bale compared to the middle region of the bale.

Conventional balers include a device to sense uneven crop material distribution within a bale. The device also alerts the operator when a side of the bale has too little crop material so that the operator can move the baler laterally to increase material flow to that side.

SUMMARY

The following brief summary is provided to indicate the nature of the subject matter disclosed herein. While certain aspects of the present invention are described below, the summary is not intended to limit the scope of the present invention.

Embodiments of the present invention provide an agricultural crop baler that does not suffer from the problems and limitations of the prior art balers set forth above.

A first aspect of the present invention concerns an agricultural crop baler that broadly includes a baling chamber, a crop pickup, and an adjustable partition mechanism. The baling chamber is configured to receive severed crop material and in which the material is formed into a bale. The crop pickup is upstream from the chamber to collect severed crop material and direct a flow of crop material toward the baling chamber. The partition mechanism is located between the crop pickup and the baling chamber to control the flow of crop material from the crop pickup to the baling chamber. The partition mechanism includes a wall assembly that at least partly defines a crop passage extending along a crop-flow direction between the crop pickup and the baling chamber. The wall assembly includes a shiftable wall that is shiftable transversely to the crop-flow direction to adjustably vary the crop passage and thereby the flow of crop material to the baling chamber.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Preferred embodiments of the invention are described in detail below with reference to the attached drawing figures, wherein.

Figure 4:
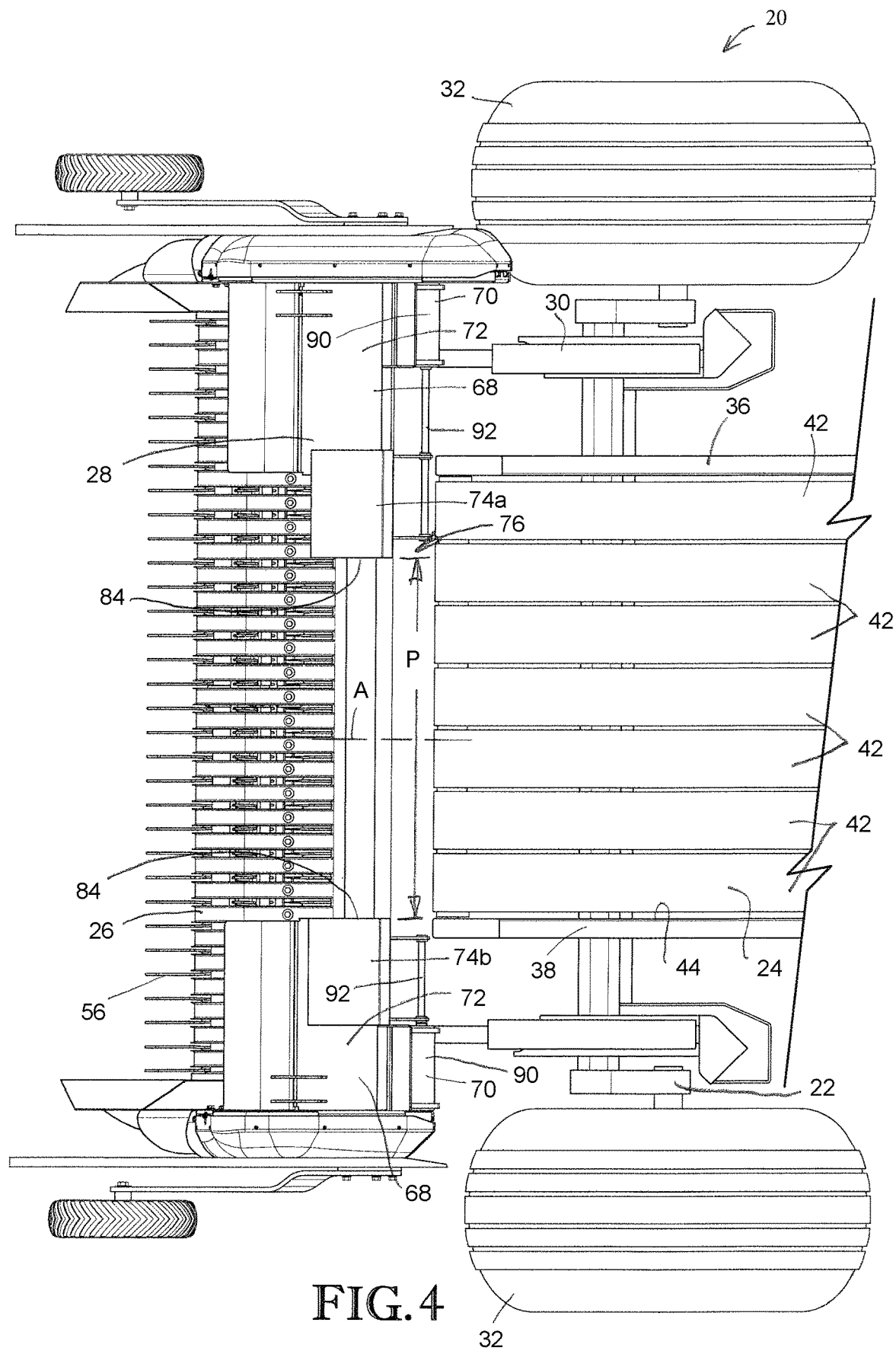
FIG. 4 is a fragmentary top view of the agricultural crop baler similar to FIG. 3, but showing right shiftable wall in an extended position and the left shiftable wall in a retracted position.
Figure 5:
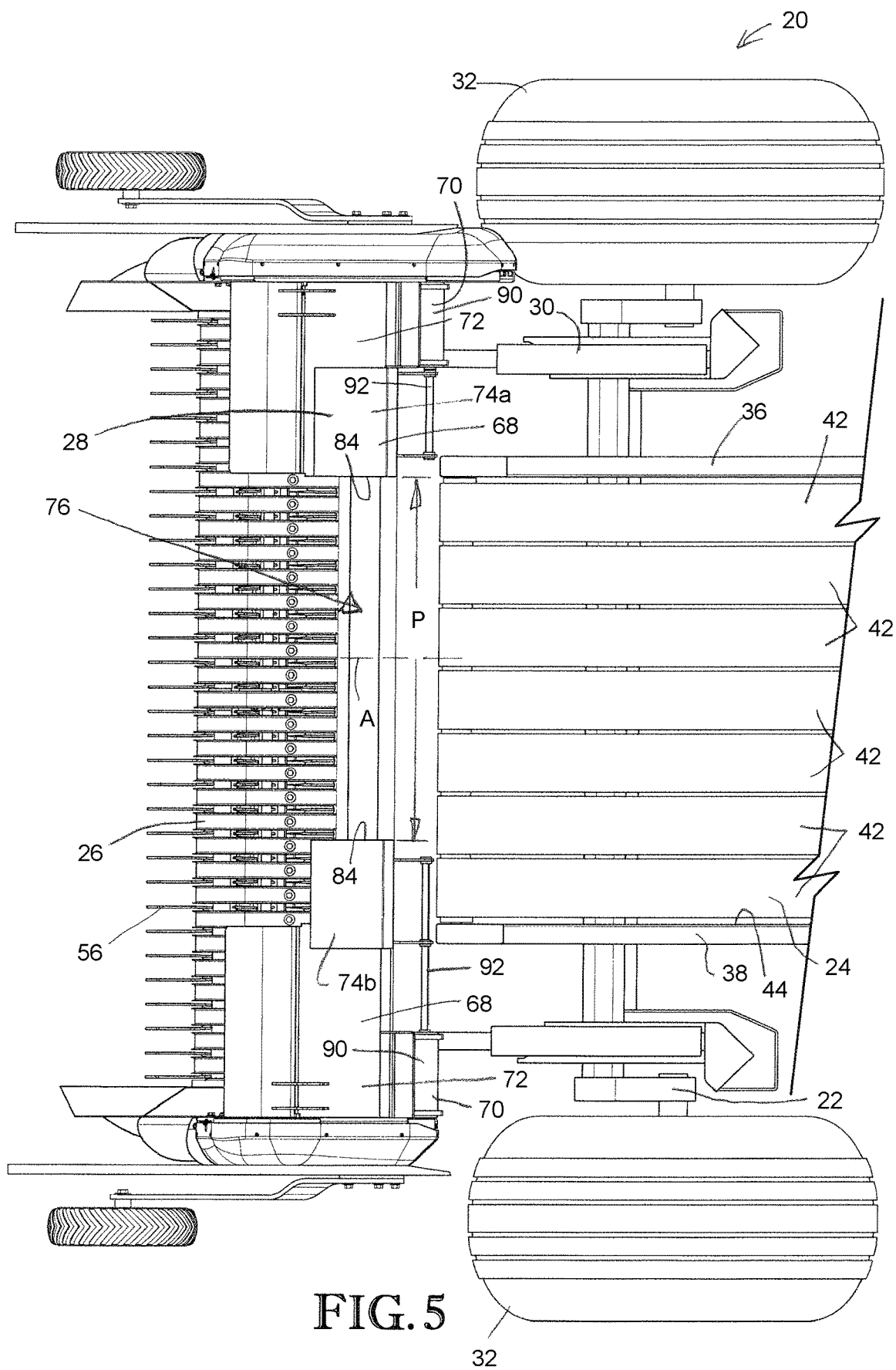
Figure 6:
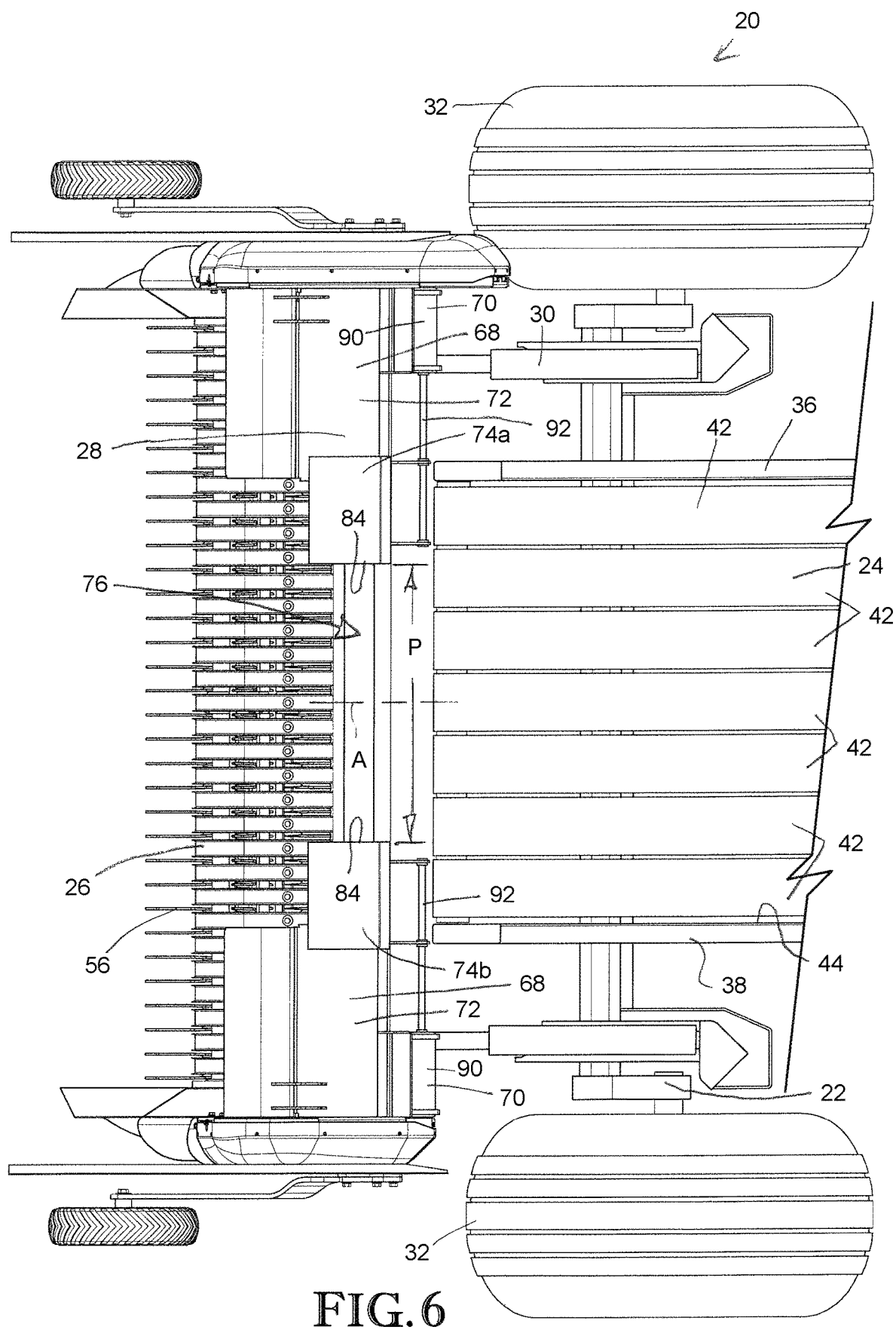

FIG. 5 is a fragmentary top view of the agricultural crop baler similar to FIG. 4, but showing the left shiftable wall shifted from the retracted position to the extended position and the right shiftable wall shifted from the extended position to the retracted position; and FIG. 6 is a fragmentary top view of the agricultural crop baler similar to FIGS. 4 and 5, but showing both of the shiftable walls in the extended position.

The drawing figures do not limit the present invention to the specific embodiments disclosed and described herein. The drawings are not necessarily to scale, emphasis instead being placed upon clearly illustrating the principles of the preferred embodiment.

DETAILED DESCRIPTION OF THE PREFERRED EMBODIMENTS

Figure 1:
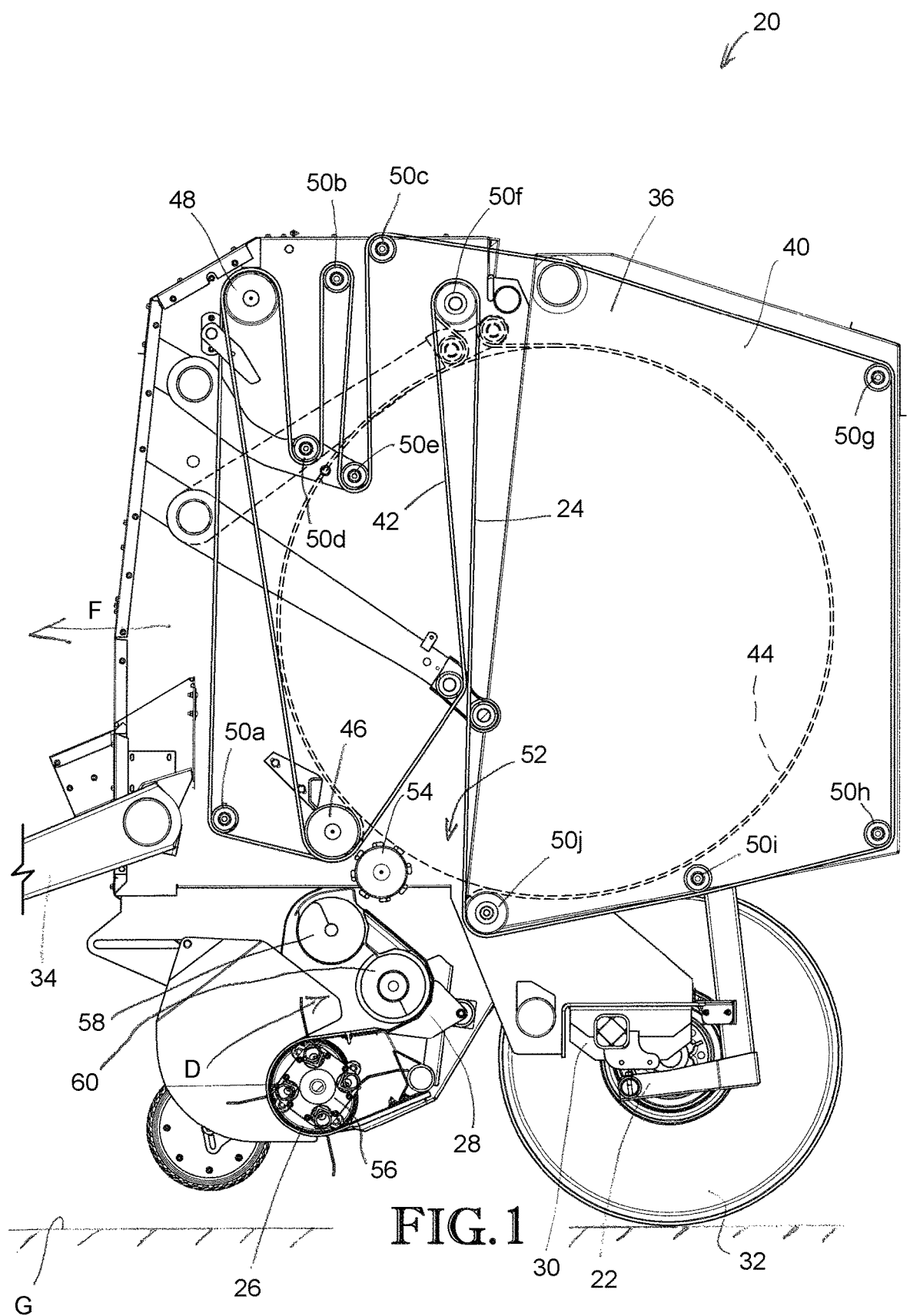
FIG. 1 is a fragmentary side elevation of an agricultural crop baler constructed in accordance with a preferred embodiment of the present invention, with the baler including a wheeled chassis, bale forming assembly, crop pickup, upper and lower augers, and partition mechanism.
Figure 2:
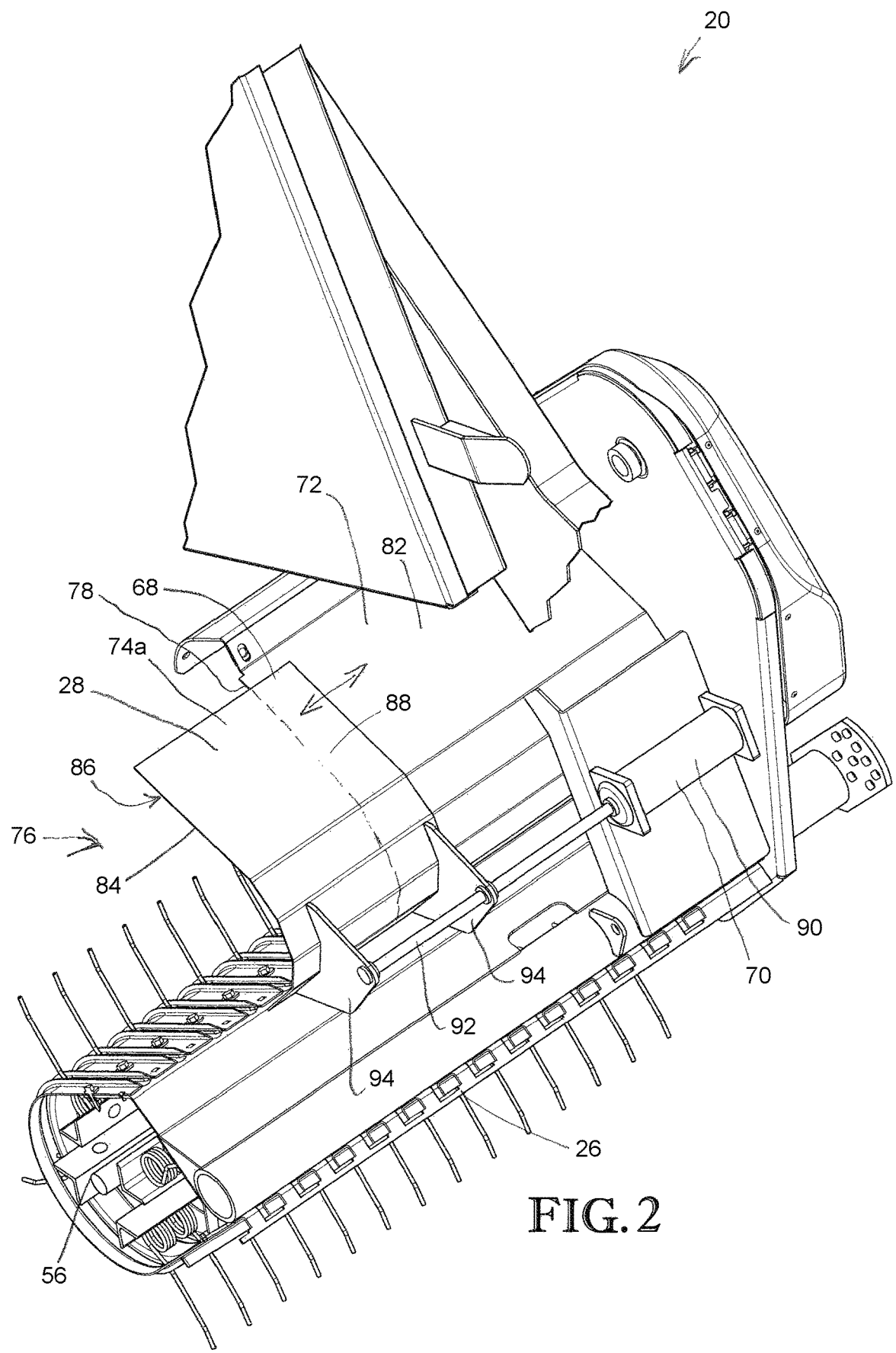
FIG. 2 is a fragmentary rear perspective of the agricultural crop baler shown in FIGS. 1 and 1a, showing a fixed outboard wall, shiftable wall, and actuator of the partition mechanism.
Figure 3:
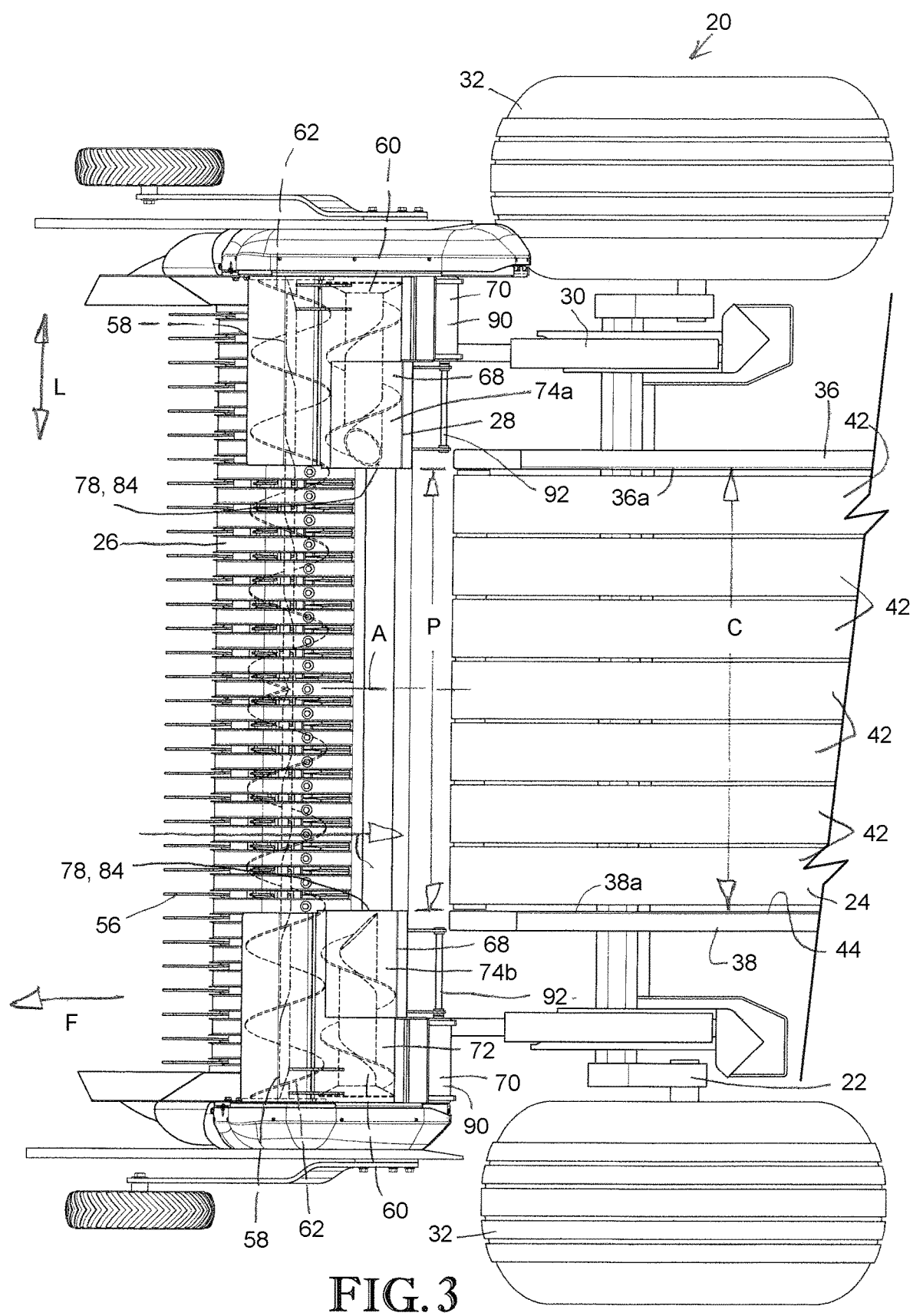
FIG. 3 is a fragmentary top view of the agricultural crop baler shown in FIGS. 1-2, showing opposite shiftable walls of the partition mechanism, with the shiftable walls located in a retracted position.

Turning initially to FIGS. 1-3, an agricultural crop baler 20 is constructed in accordance with a preferred embodiment of the present invention. In the usual manner, the baler 20 is configured to be advanced along a windrow of severed crop material (not shown) laying in a field. The baler 20 is preferably advanced in a forward direction F across a field. As is customary, the baler 20 is towed in the forward direction F by a self-propelled agricultural tractor (not shown) or other self-propelled vehicle. During advancement, the baler 20 is operable to pick up the windrow and form the crop material into one or more crop bales (not shown). The baler 20 preferably includes a wheeled chassis 22, a bale forming assembly 24, a crop pickup 26, and a partition mechanism 28.

The baler 20 is preferably configured to form bales from various types of severed crop material. For instance, the crop material could include any of a wide range of hay grasses, such as alfalfa, brome grass, Sudan grass, and ryegrass. It will also be appreciated that the baler 20 is operable to form bales from other types of crop materials, such as wheat, oats, silage, corn, milo, etc.

The wheeled chassis 22 preferably includes a chassis frame 30 and a pair of ground engaging wheels 32 that support the frame 30 for advancement along ground G. The frame 30 preferably includes a tongue 34 that projects forwardly from a remainder of the chassis 22 for connection with the tractor or another towing vehicle.

The chassis 22 carries a pair of upright, laterally spaced right and left sidewalls 36,38 (see FIG. 3) that cooperate to define a space within which bale forming and bale wrapping operations may be carried out as baler 20 is advanced across a field.

Sidewalls 36,38 present stationary forward portions fixed to chassis 22 and rearward portions swingably attached to forward portions at an elevated pivot (not shown). Rearward portions of sidewalls 36,38 cooperatively define a tailgate 40 (see FIG. 1) that is swingable between an open discharge position (not shown), in which tailgate 40 is sufficiently raised to allow a completely formed to bale to be discharged from baler 20, and a closed baling position (as illustrated), in which the bale forming and wrapping operations are performed.

The bale forming assembly 24 is operably mounted on the chassis 22 to receive crop material and form the material into one or more bales. The assembly 24 preferably includes a plurality of endless belts 42 (see FIGS. 1 and 3) mounted in series on rolls. The rolls and belts 42 cooperate with sidewalls 36,38 to define an internal baling chamber 44 that assumes different shapes and sizes throughout the bale forming cycle. In this respect, illustrated round baler 20 is a so-called "variable chamber" belt-type machine, wherein baling chamber 44 is initially relatively small, and then grows progressively larger as the bale increases in diameter within baler 20. It will be appreciated, however, that the principles of the present invention are also applicable to a "fixed chamber" machine (not shown) in which the dimensions of a baling chamber are at least substantially constant throughout the baling cycle, with the diameter of such a chamber corresponding substantially with the diameter of a full-size bale.

Furthermore, although the baler 20 is preferably in the form of a round baler, the baler could alternatively include a square baler mechanism without departing from the scope of the present invention.

With the foregoing general explanation in mind, bale forming mechanism 34 of illustrated baler 20 also includes a plurality of laterally extending, stationary rolls. The rolls preferably a lower drive roll 46, an upper drive roll 48, and a plurality of idler rolls 50*a-j* (see FIG. 1). It is noted that a subset of the idler rolls 50 are stationary with respect to their position relative to baler frame 22, while another subset of the idler rolls 50 are mounted to swingable structure.

The rolls 50*a-j* are arranged between sidewalls 36,38 in a generally circular pattern (when viewed from the left side shown in FIG. 1) for guiding the plurality of laterally spaced endless belts 42 as belts 42 are driven linearly during bale formation and wrapping. While the bale forming assembly 24 of the depicted embodiment is made up of a plurality of belts 42 and rolls 50*a-j*, alternative baling elements (e.g., one or more alternative belts and/or an alternative set of rolls) could alternatively be used in a baler, as will be understood by one of ordinary skill in the art, without departing from the teachings of the present invention. For example, features of the present invention could be implemented in a square baler instead of a round baler. In a square baler embodiment, it will be appreciated that the bale forming assembly would include, among other things, a reciprocating plunger to form crop material into a bale.

Figure 1A:
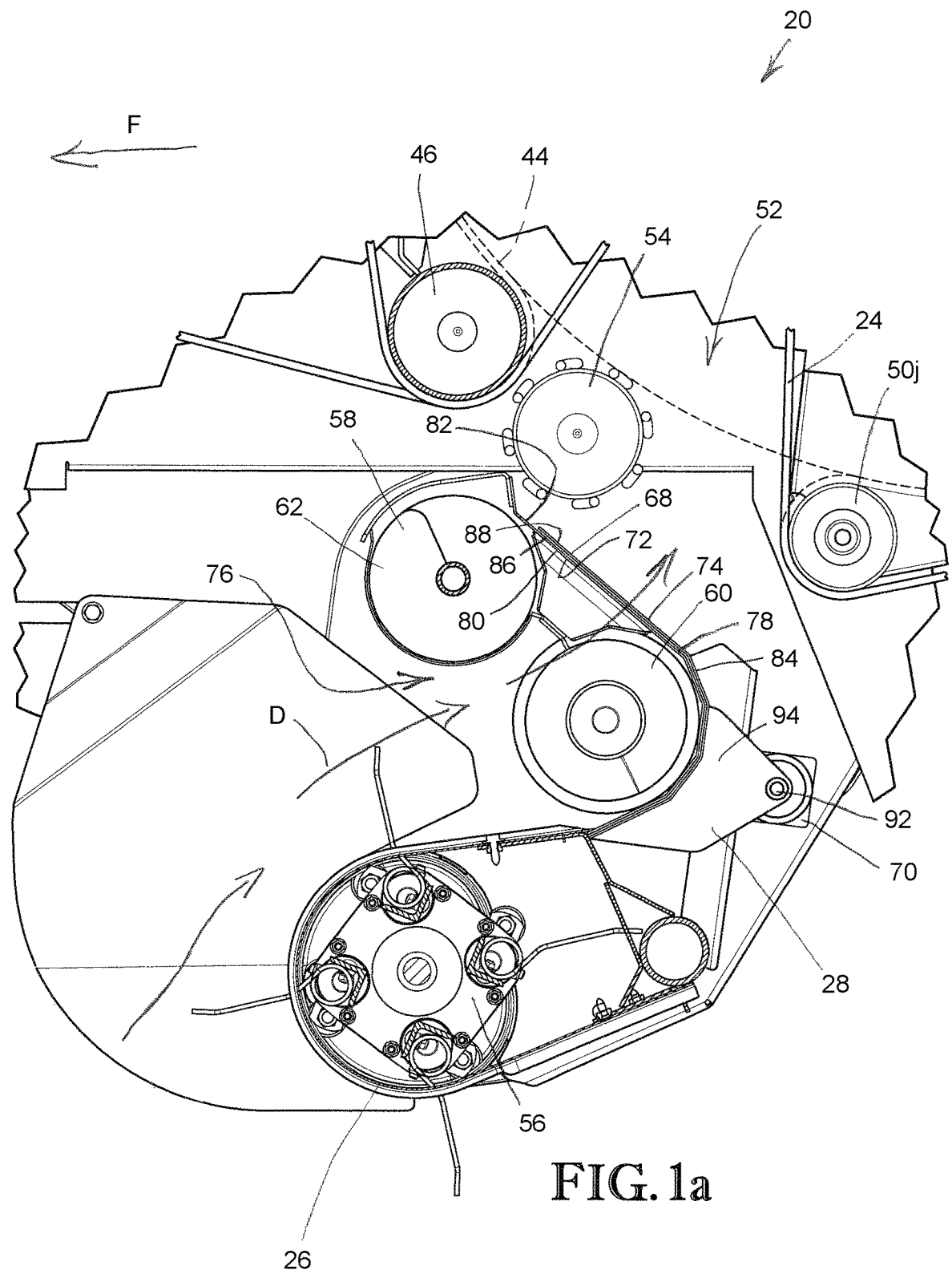
FIG. 1a is an enlarged fragmentary side elevation of the agricultural crop baler shown in FIG. 1, showing the partition mechanism located between the augers and the bale forming assembly to control the flow of severed crop material into a baling chamber presented by the bale forming assembly.

Baling chamber 44 is open at the bottom to present a baling chamber inlet 52 defined generally between a starter roll 54 and idler roll 50*j* (see FIGS. 1 and 1*a*). Baling chamber 44 is located well above and off of the ground. Therefore, the pickup 26 is provided for picking up crop material as baler 20 moves across the field and for directing the crop material toward baling chamber 44 in a crop-flow direction D (see FIG. 1*a*). The baling chamber 44 presents a chamber width dimension C measured transversely to the crop-flow direction D (see FIG. 3).

Although not illustrated in detail, it will be readily appreciated by one of ordinary skill in the art that the pickup 26 has a standard resilient rotary rake tine assembly 56 for picking crop material up off of the ground G (see FIGS. 1*a* and 2). In the illustrated embodiment, the rake tine assembly 56 is wider than baling chamber 44 in a lateral direction L transverse to the path of travel of baler 20 (see FIG. 3).

Turning to FIGS. 1*a* and 3, the depicted baler 20 is also preferably provided with an upper auger 58 and lower stub augers 60. In the depicted embodiment, the upper auger 58 extends along the entire width of the pickup 26. As will be understood by one of ordinary skill in the art, the upper auger 58 is center-gathering and includes opposite auger sections 62 that converge to a central location. However, it is within the scope of the present invention where the upper auger is variously configured. For instance, the upper auger could have endmost auger sections on either side of a conditioning roll (not shown). The lower stub augers 60 are located adjacent to respective sections of the upper auger 58 and are also center-gathering.

Although not depicted, the pickup 26 may also include a rigid tooth feeder positioned between the rake tine assembly 56 and chamber inlet 52 for delivering crop material from the rake tine assembly 56 toward the augers 58,60 and the baling chamber 44 during successive stuffing strokes.

Turning to FIGS. 1-6, the partition mechanism 28 is configured to generally facilitate adjustable gathering of crop material for delivery to the baling chamber 44. As will be described in greater detail, the partition mechanism 28 is also operable to adjustably control the flow of crop material from the crop pickup 26 to the baling chamber 44. The partition mechanism 28 preferably includes an adjustable wall assembly 68 and actuators 70.

In the illustrated embodiment, the wall assembly 68 includes a pair of spaced apart outboard walls 72 and a pair of shiftable walls 74*a,b* (see FIGS. 1*a*-3). As will be explained, the wall assembly 68 preferably defines a crop passage 76 extending along the crop-flow direction D and located between the crop pickup 26 and the baling chamber 44. The crop passage 76 has a variable passage width and presents a passage width dimension P (see FIGS. 3-6). The crop passage 76 also presents a central axis A.

The depicted outboard walls 72 are located substantially laterally outboard of the baling chamber 44 on opposite sides thereof. The outboard walls 72 are preferably supported by and fixed relative to the chassis 22. The depicted walls 72 are also fixed relative to the sidewalls 36,38 and positioned generally forwardly thereof. Each wall 72 presents an inboard margin 78 and opposite front and back surfaces 80,82 (see FIGS. 1a and 2). The illustrated walls 72 are positioned so that the inboard margins 78 are substantially laterally aligned with respective interior surfaces 36a, 38a presented by the side walls 36,38 (see FIG. 3).

The shiftable walls 74 are preferably shiftable to adjustably position the crop passage 76. As will be described, the walls 74 are movable transversely relative to the crop-flow direction D to adjustably position the crop passage along the lateral direction L.

Each shiftable wall 74a,b comprises a unitary plate that presents an inboard margin 84, front surface 86, and back surface 88 (see FIGS. 1a and 2). The illustrated walls 74a,b are preferably mounted rearwardly of the respective outboard walls 72 for sliding movement in a straight line along the lateral direction L. It is also within the ambit of the present invention where the shiftable walls 74 are located forwardly of the outboard walls 72.

Although the depicted walls 72,74 extend in the lateral direction L, one or more of the outboard walls and/or shiftable walls could be arranged at an oblique angle relative to the lateral direction L. For instance, the outboard walls and/or shiftable walls could have a funnel-type arrangement where opposite walls extend rearwardly and converge toward each other so that the walls cooperatively funnel crop material toward the center of the crop passage. In such an alternative embodiment, the shiftable walls could be shiftable along a direction arranged obliquely relative to the lateral direction L. Such an alternative wall assembly could be configured to facilitate the adjustable gathering of crop materials such that the baler may include an alternative auger arrangement for feeding material or even no augers.

The depicted walls 72,74 are generally complementally shaped to provide a parallel wall arrangement where the front surface 80 of the outboard wall 72 faces and slidably engages the back surface 88 of the respective shiftable wall 74. However, the walls 74a,b could be alternatively shiftably mounted relative to the walls 72. For instance, the shiftable walls could be swingably mounted. Furthermore, the shiftable wall could have an alternative curved shape and be swingable along a curved line that conforms to the curved shape of the wall.

Turning to FIGS. 3-6, respective pairs of walls 72,74 are located on opposite sides of the crop passage 76. The walls 74a,b are each laterally shiftable into and out of a retracted position to adjustably position the crop passage (see FIG. 3). When retracted, the shiftable walls 74a,b are substantially laterally outboard of the baling chamber 44. However, for some aspects of the present invention, only a portion of the shiftable walls could be located laterally outboard of the baling chamber in the retracted position.

When the shiftable walls 74a,b are in the retracted position, respective pairs of inboard margins 78,84 are substantially aligned with one another and cooperatively define the crop passage 76 (see FIG. 3). However, it is within the ambit of the present invention where only the outboard walls define the width dimension P when the shiftable walls are retracted (i.e., so that the shiftable walls do not define the width dimension). For some alternative embodiments, the wall assembly could also be configured so that only the shiftable walls define the width dimension P when the shiftable walls are retracted (i.e., so that the outboard walls do not define the width dimension).

Also in the retracted position, the passage width dimension P is at a maximum width dimension. Furthermore, the crop passage 76 preferably extends along substantially the entire chamber width dimension C. Most preferably, the crop passage 76 and the chamber 44 are substantially coextensive with each other in the lateral direction L. However, in some alternative embodiments, the crop passage could be laterally offset relative to the baling chamber in the retracted position.

The illustrated walls 74a,b are each shiftable between the retracted position, an extended position (see FIG. 6), and any of various intermediate positions (not shown) between the retracted and extended positions. When located in the extended position (and at least some of the intermediate positions), the wall 74a,b preferably extends along part of the chamber width dimension C to restrict material flow along the corresponding part of the chamber width.

Each actuator 70 preferably comprises a powered linear actuator that includes a motor body 90 and an actuator arm 92 that slides into and out of the body 90 (see FIG. 2). Although the linear actuator 70 preferably comprises an electrically-powered motor, the actuator could alternatively include a hydraulic or pneumatic motor. It is also within the ambit of the present invention where the actuator includes a rotating motor instead of a linear motor (e.g., where the rotating motor is used in combination with a transmission to produce linear motion).

The illustrated actuator 70 is preferably mounted by attaching the body 90 to a frame associated with the crop pickup 26 (see FIG. 2). However, the actuator 70 could be alternatively mounted consistent with the scope of the present invention. Each wall 74a,b is preferably drivingly attached to a respective one of the actuators 70 with brackets 94 (see FIG. 2). As a result, each wall 74a,b is configured to be driven between various positions independently of the other wall 74a,b.

It is also within the ambit of the present invention where the shiftable walls are drivingly attached to and driven by a common actuator (or powered by separate actuators but controlled to operate simultaneously). For instance, the shiftable walls could be rigidly attached relative to one another and drivingly attached to the same actuator. In such an alternative embodiment, the crop passage would be laterally shiftable without changing the size of the crop passage. That is, the central axis A of the crop passage 76 would shift laterally without changing the width of the crop passage.

Again, the illustrated walls 74a,b are preferably laterally shiftable independently of one another. For example, one of the walls 74a,b can be shifted between the retracted and extended positions while the other wall 74a,b is not shifted. On the other hand, the walls 74a,b can be shifted simultaneously in opposite directions or to varying degrees. Yet further, the walls 74a,b can be simultaneously shifted in the same direction.

This independently shiftable wall configuration allows the walls 74 to be relatively shiftable toward and away from each other to adjustably size the crop passage 76. For instance, at least one of the walls 74 can be extended (e.g., from the retracted position) to decrease the width of the crop passage 76. Similarly, at least one of the walls 74 can be retracted (e.g., from the extended position) to increase the width of the crop passage.

When increasing or decreasing the size of the crop passage 76, it will be understood that the central axis A of the crop passage 76 may be shifted laterally. For instance, when retracting or extending only one of the walls 74a,b, the central axis A will be shifted in the corresponding direction.

However, in some instances, the location of the central axis A of the passage 76 may be unchanged when changing the size of the crop passage. When the walls 74a,b are moved the same distance toward (or away from) each other, the location of the central axis A will remain unchanged. For example, when moving both walls 74a,b the same distance between the retracted position (see FIG. 3) and the extended position (see FIG. 6), the central axis location is unchanged.

It will also be appreciated that the disclosed mechanism 28 allows the walls 74 to be generally shifted with each other to shift the central axis A of the passage 76 without changing the width P of the passage 76.

In general, the walls 74a,b are preferably maintained in the retracted position (see FIG. 3) to maximize the flow of crop material into the baling chamber 44 along the entire width thereof. As the bale shape is being created by the bale-forming assembly 24, one or more sensors (not shown) of the baler 20 may determine that a region of the bale is under-filled and requires more crop material than other regions. The partition mechanism 28 can then be operated, either manually or automatically, to shift the crop passage 76 generally toward the under-filled region.

For instance, if the bale side margin adjacent the right sidewall 36 is under-filled, the wall 74a can be located in the retracted position (if necessary, by moving the wall 74a from the extended position or an intermediate position) and the wall 74b can be located in the extended position (if necessary, by moving the wall 74b from the retracted position or an intermediate position). In this manner, the central axis A is located closer to the right sidewall 36 than the left sidewall 38, and crop material is distributed to the bale accordingly.

Similarly, if the bale side margin adjacent the left sidewall 38 is under-filled, the wall 74b can be located in the retracted position (if necessary, by moving the wall 74b from the extended position or an intermediate position) and the wall 74a can be located in the extended position (if necessary, by moving the wall 74a from the retracted position or an intermediate position). In this manner, the central axis A is located closer to the left sidewall 38 than the right sidewall 36, and crop material is distributed to the bale accordingly.

Upon correction of the under-filled condition, the baler sensors may determine that another region of the bale is under-filled. In this instance, the partition mechanism 28 can then be operated, either manually or automatically, to shift the crop passage 76 generally toward this newly identified under-filled region by shifting one or both of the walls 74a,b accordingly.

Upon correction of the under-filled condition, the baler sensors may instead determine that no region of the bale is under-filled. In this event, the partition mechanism 28 can be operated to return the walls 74a,b to the retracted position.

The partition mechanism 28 is generally configured to respond in this manner to sensed under-filled conditions. However, it will be understood that the partition mechanism 28 could be programmed to shift the walls 74a,b as part of a computerized operational program. For instance, the walls 74a,b could be configured to shift side-to-side with each other (e.g., between the location in FIG. 4 and the location in FIG. 5) to provide uniform distribution of crop materials along the width of the bale.

In operation, the baler 20 is towed by a vehicle in the forward direction F along a windrow to pickup crop material and form the crop material into one or more bales. The crop pickup 26 collects the crop material from the ground, primarily during baler advancement, and directs the crop material along the crop-flow direction toward the augers 58,60. The augers 58,60 are configured to gather the crop materials and thereby direct the crop materials through the crop passage 76 and into the baling chamber 44.

The partition mechanism 28 is operated to direct crop materials into the baling chamber 44 and to facilitate a uniform distribution of crop materials along the width of the bale. In general, the walls 74a,b are preferably maintained in the retracted position (see FIG. 3) to maximize the flow of crop material into the baling chamber 44. As a region of the bale becomes under-filled, the partition mechanism 28 can be operated, either manually or automatically, to shift the crop passage 76 generally toward the under-filled region.

Although the above description presents features of preferred embodiments of the present invention, other preferred embodiments may also be created in keeping with the principles of the invention. Such other preferred embodiments may, for instance, be provided with features drawn from one or more of the embodiments described above. Yet further, such other preferred embodiments may include features from multiple embodiments described above, particularly where such features are compatible for use together despite having been presented independently as part of separate embodiments in the above description.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably fair scope of the present invention as pertains to any apparatus not materially departing from but outside the literal scope of the invention as set forth in the following claims.

What is claimed is:

1. An agricultural crop baler comprising:
   a baling chamber configured to receive severed crop material and in which the material is formed into a bale, the baling chamber having a first sidewall and a second sidewall opposite said first sidewall and presenting a chamber width dimension between the first and second sidewalls;
   a crop pickup upstream from the chamber to collect severed crop material and direct a flow of crop material in a crop-flow direction toward the baling chamber, said chamber width dimension extending transversely to the crop-flow direction; and
   an adjustable partition mechanism located between the crop pickup and the baling chamber to control the flow of crop material from the crop pickup to the baling chamber,
   said partition mechanism including a wall assembly that at least partly defines a crop passage extending along the crop-flow direction between the crop pickup and the baling chamber, said crop passage having a central axis, said wall assembly including a first shiftable wall and a second shiftable wall spaced from the first shiftable wall, said first and second shiftable walls being located on opposite sides of the crop passage, wherein the first and second shiftable walls are shiftable transversely to the crop-flow direction to adjustably vary the central axis of the crop passage in a lateral direction along the chamber width dimension and thereby the flow of crop material to the baling chamber.

2. The agricultural crop baler as claimed in claim 1, said first shiftable wall being laterally shiftable relative to the baling chamber into and out of a retracted position, with the first shiftable wall being laterally outboard of the baling chamber in the retracted position.

3. The agricultural crop baler as claimed in claim 2, said wall assembly being located in the retracted position so that the crop passage extends along substantially the entire chamber width dimension.

4. The agricultural crop baler as claimed in claim 2, said first shiftable wall being laterally shiftable into and out of an extended position where the first shiftable wall extends along part of the chamber width dimension to restrict material flow therealong.

5. The agricultural crop baler as claimed in claim 4, said wall assembly including a first outboard wall fixed relative to the wheeled chassis and positioned at least partly laterally outboard of the baling chamber, with first the shiftable wall being shiftable relative to the outboard wall between the retracted and extended positions.

6. The agricultural crop baler as claimed in claim 1, each of said first and second shiftable walls being laterally shiftable relative to the baling chamber into and out of a retracted position, with each shiftable wall being laterally outboard of the baling chamber in the retracted position.

7. The agricultural crop baler as claimed in claim 6, said first and second shiftable walls being located in the retracted position so that the crop passage extends along substantially the entire chamber width dimension.

8. The agricultural crop baler as claimed in claim 6, each of said first and second shiftable walls being laterally shiftable into and out of an extended position where the shiftable wall extends along part of the chamber width dimension to restrict material flow therealong.

9. The agricultural crop baler as claimed in claim 8, said wall assembly including outboard walls fixed relative to the wheeled chassis and positioned at least partly laterally outboard of the baling chamber on opposite sides thereof, with the first and second shiftable walls being shiftable relative to the outboard walls between the retracted and extended positions.

10. The agricultural crop baler as claimed in claim 1, said first and second shiftable walls being positionable to cooperatively define the crop passage and being laterally shiftable toward and away from each other to adjustably size the crop passage.

11. The agricultural crop baler as claimed in claim 1, said partition mechanism including a powered actuator drivingly coupled to the first shiftable wall to move the wall transversely.

12. The agricultural crop baler as claimed in claim 11, said actuator comprising a linear actuator.

13. The agricultural crop baler as claimed in claim 1, further comprising:
a bale forming assembly that defines the baling chamber and is configured to form the material into a bale.

14. The agricultural crop baler as claimed in claim 13, said bale forming assembly presenting an inlet that communicates with the baling chamber, said inlet located downstream of the crop pickup and configured to permit the flow of crop material into the baling chamber.

15. The agricultural crop baler as claimed in claim 14, said partition mechanism being located upstream of the inlet.

16. The agricultural crop baler as claimed in claim 13, said bale forming assembly including a plurality of belts and rolls such that the baling chamber is expandable.

* * * * *